US011492495B2

(12) United States Patent
Schultz et al.

(10) Patent No.: US 11,492,495 B2
(45) Date of Patent: *Nov. 8, 2022

(54) MODIFIED ALUMINUM NITRIDE PARTICLES AND METHODS OF MAKING THE SAME

(71) Applicant: 3M INNOVATIVE PROPERTIES COMPANY, St. Paul, MN (US)

(72) Inventors: Nathan E. Schultz, Woodbury, MN (US); Li Yao, Woodbury, MN (US); Tien T. Wu, Woodbury, MN (US); Gerry A. Hoffdahl, Scandia, MN (US); Jimmie R. Baran, Jr., Prescott, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/980,145

(22) PCT Filed: Mar. 19, 2019

(86) PCT No.: PCT/IB2019/052233
§ 371 (c)(1),
(2) Date: Sep. 11, 2020

(87) PCT Pub. No.: WO2019/180619
PCT Pub. Date: Sep. 26, 2019

(65) Prior Publication Data
US 2021/0009811 A1 Jan. 14, 2021

Related U.S. Application Data

(60) Provisional application No. 62/464,535, filed on Mar. 22, 2018.

(51) Int. Cl.
*C08K 3/28* (2006.01)
*C09C 1/40* (2006.01)
*C08K 9/04* (2006.01)

(52) U.S. Cl.
CPC .............. *C09C 1/40* (2013.01); *C08K 3/28* (2013.01); *C08K 9/04* (2013.01); *C08K 2003/282* (2013.01)

(58) Field of Classification Search
CPC ...... C08K 3/28; C08K 9/04; C08K 2003/282; C09C 1/40; C08F 292/00; C08F 2/44; C04B 41/009; C04B 41/4584
USPC ........................................................ 523/206
See application file for complete search history.

(56) References Cited

U.S. PATENT DOCUMENTS

| | | |
|---|---|---|
| 2,318,570 A | 5/1943 | Carlton |
| 2,370,636 A | 3/1945 | Carlton |
| 3,079,272 A | 2/1963 | Greig |
| 4,314,827 A | 2/1982 | Leitheiser |
| 4,623,364 A | 11/1986 | Cottringer |
| 4,744,802 A | 5/1988 | Schwabel |
| 4,770,671 A | 9/1988 | Monroe |
| 4,881,951 A | 11/1989 | Wood |
| 5,106,691 A | 4/1992 | Harwell |
| 5,417,726 A | 5/1995 | Stout |
| 5,426,136 A | 6/1995 | Waddell |
| 5,766,277 A | 6/1998 | DeVoe |
| 5,879,492 A | 3/1999 | Reis |
| 6,249,159 B1 | 6/2001 | Johnson |
| 6,664,354 B2 | 12/2003 | Savu |
| 6,986,943 B1 * | 1/2006 | Cook .................... B82Y 30/00 428/404 |
| 8,771,801 B2 | 7/2014 | Moren |
| 8,869,740 B2 | 10/2014 | Moren |
| 8,894,466 B2 | 11/2014 | Jungbauer |
| 9,349,498 B2 | 5/2016 | Lottes |
| 2006/0265966 A1 | 11/2006 | Rostal |
| 2007/0098990 A1* | 5/2007 | Cook .................... C08K 3/346 428/404 |
| 2009/0165394 A1 | 7/2009 | Culler |
| 2009/0169816 A1 | 7/2009 | Erickson |
| 2011/0101265 A1 | 5/2011 | Kambara |
| 2011/0219703 A1 | 9/2011 | Fuchs |
| 2011/0240340 A1 | 10/2011 | Takanaga |
| 2012/0000135 A1 | 1/2012 | Eilers |
| 2012/0252321 A1 | 10/2012 | Jungbauer et al. |
| 2015/0236213 A1 | 8/2015 | Tchoul |
| 2016/0068729 A1 | 3/2016 | Erickson |
| 2017/0240788 A1 | 8/2017 | Perez |
| 2017/0247546 A1 | 8/2017 | Takahashi |

(Continued)

FOREIGN PATENT DOCUMENTS

| | | |
|---|---|---|
| CN | 102532606 A | 7/2012 |
| JP | 10203809 A | 8/1998 |
| JP | 6169466 B2 | 7/2017 |

(Continued)

OTHER PUBLICATIONS

Chan, "Surface modification of piezoelectric aluminum nitride with functionalizable organosilane adlayers", Applied Surface Science, Oct. 2013, vol. 282, pp. 709-713.

Chiu, "Surface modification of aluminum nitride by polysilazane and its polymer-derived amorphous silicon oxycarbide ceramic for the enhancement of thermal conductivity in silicone rubber composite", Applied Surface Science, Feb. 2014, vol. 292, pp. 928-936.

Choudhury, "Effect of Surface Modification of Aluminum Nitride on Electrical and Thermal Characterizations of Thermosetting Polymeric Nanocomposites", Poly Composites, Jan. 2013, vol. 34, pp. 1-14.

Guo, "Surface modification of AlN Powder by aluminum duhydrogen phosphate and phosphoric acid", Electronic Components and Materials, Feb. 2010, vol. 29, No. 2, pp. 37-40.

(Continued)

*Primary Examiner* — Hannah J Pak
(74) *Attorney, Agent, or Firm* — Jean A. Lown

(57) ABSTRACT

A modified aluminum nitride particle comprises an aluminum nitride core and a shell surrounding the aluminum nitride core. The shell comprises a crosslinked organic polymer. Methods of making the modified aluminum nitride particle by admicellar polymerization are also disclosed.

10 Claims, 1 Drawing Sheet

(56) References Cited

U.S. PATENT DOCUMENTS

| | | | |
|---|---|---|---|
| 2017/0369778 A1 | 12/2017 | Chou et al. | |
| 2021/0002137 A1* | 1/2021 | Schultz | B24D 3/28 |

FOREIGN PATENT DOCUMENTS

| | | |
|---|---|---|
| KR | 20130041554 A | 4/2013 |
| WO | WO 93-12911 | 7/1993 |
| WO | WO 99-14036 | 3/1999 |
| WO | WO 01-27215 | 4/2001 |
| WO | WO 2005-056621 | 6/2005 |
| WO | WO 2007-019229 | 2/2007 |
| WO | WO 2010-074862 | 7/2010 |
| WO | WO 2011-068678 | 6/2011 |
| WO | WO 2016-196936 | 12/2016 |
| WO | WO 2017-007673 | 1/2017 |
| WO | WO 2019-180621 | 9/2019 |

OTHER PUBLICATIONS

Iliashevsky, "Functionalization of Silica Surface with UV-Active molecules by Multivalent Organosilicon Spacer", Open Journal of Inorganic Chemistry, Jul. 2016, vol. 6, No. 3, pp. 163-174.

Kim, "Thermal and mechanical properties of AlN/BN-filled PVDF composite for solar cell backsheet application", Ceramics International, Jan. 2015, vol. 41, No. 1, pp. 179-187.

Kirk-Othmer, Encyclopedia of Chemical Technology, 347-386, (1983).

Li, "Surface modification of aluminium nitride powder", Journal of Materials Science Letter, Jan. 1996, No. 15, pp. 1758-1761.

Ma, "Thermal Conductivity Polypropylene/Aluminium Nitride Composites", Advanced Materials Research, Feb. 2011, vol. 194, pp. 1577-1580.

Ohashi, "Spherical Aluminum Nitride Fillers for Heat-Conducting Plastic Packages", Journal of the American Ceramic Society, Sep. 2005, vol. 88, No. 9, pp. 2615-2618.

Peng, "Electrical and thermophysical properties of epoxy/aluminum nitride nanocomposites: Effects of nanoparticle surface modification", Composites Part A: Applied Science and Manufacturing, Sep. 2010, vol. 41, No. 9, pp. 1201-1209.

Qian, "Efficient thermal properties enhancement to hyperbranched aromatic polyamide grafted aluminum nitride in epoxy composites", Polymers Advanced Technology, Jan. 2013, vol. 24, pp. 348-356.

Rottondi, "Optical Ring Metro Networks with Flexible Grid and Distance-Adaptive Optical Coherent Transceivers", Bell Labs Technical Journal, 2013, vol. 18, No. 3, pp. 95-110.

Wang, "Hydrolysis Control of AlN Powders for the Aqueous Processing of Spherical AlN Granules", Journal of the American Ceramic Society, May 2013, vol. 96, No. 5, pp. 1383-1389.

Wattanakul, "Effective Surface Treatments for Enhancing the Thermal Conductivity of BN-Filled Epoxy Composite", Journal of Applied Polymer Science, 2011, vol. 119, pp. 3234-3243.

Wereszczak, "Thermally Conductive MgO-filled Epoxy Molding Compounds", IEEE Transactions on Components, Packaging and Manufacturing Technology, 2013, vol. 3, No. 12, pp. 1994-2005.

Yang, "Thermal conductivity and dielectric properties of PEDOT:PSS-AlN filler reinforced water-soluble polymer composites", Ceramics International, Aug. 2017, vol. 43, No. 1, pp. S710-S716.

Yu, "Thermal conductivity of polystyrene-aluminum nitride composite", Composites Part A, Applied Science and Manufacturing, 2002, vol. 33, pp. 289-292, XP4320161.

Zhou, "The use of polyimide-modified aluminum nitride fillers in AlN@PI/Epoxy composites with enhanced thermal conductivity for electronic encapsulation", Scientific Reports, 2014, vol. 4, pp. 1-6.

Zhou, "Thermoplastic Polypropylene/Aluminum Nitride Nanocomposites with Enhanced Thermal Conductivity and Low Dielectric Loss", IEEE Transactions on Dielectrics and Electrical Insulation, Oct. 2016, vol. 23, No. 5, pp. 2768-2776.

International Search Report for PCT International Application No. PCT/IB2019/052233, dated Jul. 15, 2019, 6 pages.

Liangsheng Qiang et al., Harbin Institute of Technology Press, "Preparation and Characterization of Novel Functional Materials", Sep. 30, 2017, pp. 193-194.

* cited by examiner

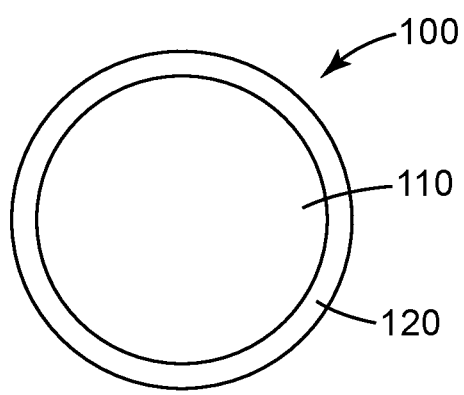

MODIFIED ALUMINUM NITRIDE PARTICLES AND METHODS OF MAKING THE SAME

TECHNICAL FIELD

The present disclosure broadly relates to modified aluminum nitride particles and methods of making them.

BACKGROUND

Aluminum nitride (i.e., MN) is attractive for use as a thermal filler due to its isotropic high thermal conductivity (about 250 watts/meter-Kelvin (W/m-K)). While hexagonal boron nitride has a higher thermal conductivity (about 270 W/m-K), it is not isotropic. The isotropic nature of AlN makes it a good candidate for thru-plane conductivity and in-plane conductivity. However, a major drawback of MN is that it is hydrolytically unstable, and readily decomposes to form aluminum hydroxide and ammonia, making it unsuitable for those applications where contact with water (e.g., as liquid or vapor) is likely.

SUMMARY

Advantageously, the present inventors have developed modified aluminum nitride particles that impart stability to water and other moist environments. Unexpectedly, a method developed to make the modified aluminum nitride particles is carried out in an aqueous medium.

In one aspect, the present disclosure provides a modified aluminum nitride particle comprising an aluminum nitride core and a shell surrounding the aluminum nitride core, wherein the shell comprises a crosslinked organic polymer. The present disclosure also provides a plurality of the modified aluminum nitride particles. The present disclosure also provides a composition comprising a plurality of the modified aluminum nitride particles retained in an organic binder material.

In another aspect, the present disclosure provides a method of making modified aluminum nitride particles, the method comprising:

providing an aqueous acidic mixture of aluminum nitride particles and surfactant;

adding at least one hydrophobic free-radically polymerizable monomer to the aqueous acidic mixture to form a free-radically polymerizable mixture, wherein at least a portion of the at least one hydrophobic free-radically polymerizable monomer is disposed in a surfactant bilayer that is disposed on the aluminum nitride particles, wherein the at least one hydrophobic free-radically polymerizable monomer includes a monomer having at least two free-radically polymerizable groups; and adding a free-radical initiator to the free-radically polymerizable mixture thereby polymerizing at least a portion of the hydrophobic free-radically polymerizable monomer to form the modified aluminum nitride particles, each comprising an aluminum nitride core and a shell surrounding the aluminum nitride core, wherein the shell comprises a crosslinked organic polymer.

Modified aluminum nitrides particles according to the present disclosure are useful, for example, as thermal filler particles, electrically-insulating filler particles, and/or as abrasive particles.

As used herein:

the term "acrylic" means derived from or concerned with acrylic acid;

the term "aqueous" means containing a non-adventitious amount of water (e.g., at least 5 weight percent, at least 10 weight percent, at least 25 weight percent, at least 50 weight percent, up to and including 90 weight percent or even 100 percent water);

the term "(meth)acryl" refers to acryl and/or methacryl;

the term "shell" refers to a thin external layer enclosing an aluminum nitride particle, wherein the layer has a thickness of less than the average thickness (e.g., less than 90 percent, less than 80 percent, less than 50 percent, less than 30 percent, or even less than 10 percent) of the aluminum nitride particle; and the term "surrounding" means extending on all sides of simultaneously, encircling.

Features and advantages of the present disclosure will be further understood upon consideration of the detailed description as well as the appended claims.

BRIEF DESCRIPTION OF THE DRAWINGS

FIG. 1 is a schematic cross-sectional view of an exemplary modified aluminum nitride particle according to the present disclosure.

It should be understood that numerous other modifications and embodiments can be devised by those skilled in the art, which fall within the scope and spirit of the principles of the disclosure. The figure may not be drawn to scale.

DETAILED DESCRIPTION

Referring now to FIG. 1, modified aluminum nitride particle 100 comprises an aluminum nitride core 110 and a shell 120 surrounding the aluminum nitride core 110. The shell 120 comprises a crosslinked organic polymer.

Aluminum nitride particles suitable for use in making modified aluminum nitride particles are available from commercial sources in a variety of sizes. Commercial suppliers include, for example: MilliporeSigma, Milwaukee, Wis.; H. C. Starck, Karlsruhe, Germany; Tokuyama Corp., Tokyo, Japan; and Surmet Corp., Burlington, Mass. The aluminum nitride particles may be milled and/or sorted by size.

The aluminum nitride particles may have any particulate size and distribution; however, the selection of size and shape typically influences the thermal conductivity and mechanical properties of the interface material, including thermal conductivity, impact strength, tensile strength, filler loading, processability, and flowability. For example, smaller particle sizes typically lead to lower interparticle distance and a greater chance for the formation of thermal pathways. At the same time, smaller particle sizes may bring more interfacial area for thermal resistance. Greater interparticle distances may allow for greater flowability. In some preferred embodiments, the mean particle size of the aluminum nitride particles is from 0.1 to 100 microns, more preferably from 1 to 20 microns. Preferably, the aluminum nitride particles have a monomodal particle size distribution, although polymodal (e.g., bimodal) size distributions may also be used.

If desired, one or more flow additives may be added to the aluminum nitride particles to aid in flowability of the loose particles. Exemplary flow additives for controlling flowability include fumed or precipitated silica or alumina, or nanoparticles of silica or alumina. As used herein, the term "nanoparticle" refers to particles having an average diameter of less than 1 micron. Further details concerning flow additives can be found in, for example, U.S. Pat. No. 8,894,466 (Jungbauer et al.).

The nanoparticles may be fully condensed. Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g., zirconia) nanoparticles have a high refractive index whereas amorphous nanoparticles typically have a lower refractive index.

The inorganic (e.g., metal oxide) nanoparticles are generally hydrophilic in nature. The nanoparticles are rendered hydrophobic upon being surface modified with a hydrophobic surface treatment.

Surface modification involves attaching surface modification agents to inorganic nanoparticles to modify the surface characteristics. In general, a surface treatment has a first end that will attach to the nanoparticle surface (covalently, ionically or through strong physisorption) and a second end that imparts steric stabilization that prevents the particles from agglomerating such as permanently fusing together. The inclusion of surface modification can also improve the compatibility of the nanoparticles with other materials.

Examples of surface treatment agents include alcohols, amines, carboxylic acids, sulfonic acids, phosphonic acids, silanes and titanates. The surface treatment may optionally comprise fluorine substituents. The preferred type of treatment agent is determined, in part, by the chemical nature of the (e.g., metal oxide) nanoparticle surface. Silanes are preferred for silica and for other siliceous fillers. Silanes and carboxylic acids are preferred for metal oxides such as zirconia. When an organosilane surface treatment is applied to metal oxide nanoparticles, the silane end is generally adsorbed by the nanoparticle. When a carboxylic acid is applied to a zirconia nanoparticle, the acid end is generally adsorbed by the zirconia.

Exemplary silanes include: alkyltrialkoxysilanes such as n-octyltrimethoxysilane, n-octyltriethoxysilane, isooctyltrimethoxysilane, dodecyltrimethoxysilane, octadecyltrimethoxysilane, propyltrimethoxysilane, and hexyltrimethoxysilane; [(meth)acryloxyalkyl]trialkoxysilanes such as (3-methacryloxypropyl)trimethoxysilane, (3-acryloxypropyl)trimethoxysilane, and (3-methacryloxypropyl)-triethoxysilane; [(meth)acryloxyalkyl]alkyldialkoxysilanes such as (3-methacryloxypropyl)methyl-dimethoxysilane and (3-acryloxypropyl)methyldimethoxysilane; [(meth)acryloxyalkyl]dialkylalkoxy-silanes such as (3-methacryloxypropyl)dimethylethoxysilane; mercaptoalkyltrialkoxyl-silanes such as (3-mercaptopropyl)trimethoxysilane; aryltrialkoxysilanes such as (styrylethyl)trimethoxysilane, phenyltrimethoxysilane, phenyltriethoxysilane, and p-tolyl-triethoxysilane; vinyl silanes such as vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltri-t-butoxysilane, vinyltris(isobutoxy)silane, vinyltriisopropenoxysilane, and vinyltris(2-methoxyethoxy)silane; and combinations thereof.

Carboxylic acid surface modifying agents may comprise the reaction product of phthalic anhydride with an organic compound having a hydroxyl group. Suitable examples include, for example, phthalic acid mono-(2-phenylsulfanyl-ethyl) ester, phthalic acid mono-(2-phenoxy-ethyl) ester, or phthalic acid mono-[2-(2-methoxy-ethoxy)-ethyl] ester. In some examples, the organic compound having a hydroxyl group is a hydroxyl alkyl(meth)acrylate such as hydroxyethyl(meth)acrylate, hydroxypropyl(meth)acrylate, or hydroxybutyl (meth)acrylate. Examples include, but are not limited to, succinic acid mono-(2-acryloyloxy-ethyl) ester, maleic acid mono-(2-acryloyloxy-ethyl) ester, glutaric acid mono-(2-acryloyloxy-ethyl) ester, phthalic acid mono-(2-acryloyloxy-ethyl) ester, and phthalic acid mono-(2-acryloyl-butyl) ester. Still others include mono-(meth)acryloxy polyethylene glycol succinate and the analogous materials made from maleic anhydride glutaric anhydride and phthalic anhydride.

Various other surface treatments are known in the art; for example, as described in PCT Publ. Nos. WO 2007/019229 (Baran et al.) and WO 2010/074862 (Jones et al.).

The surface treatment may comprise a blend of two or more hydrophobic surface treatments. For example, the surface treatment may comprise at least one surface treatment having a relatively long substituted or unsubstituted hydrocarbon group. In some embodiments, the surface treatment comprises at least one hydrocarbon group having at least 6 or 8 carbon atoms, such as isooctyltrimethoxysilane, with a second surface treatment that is less hydrophobic, such as methyl trimethoxy silane. The relatively long substituted or unsubstituted hydrocarbon group typically has no greater than about 20 carbons atoms.

The surface treatment may also comprise a blend of a hydrophobic surface treatment and (e.g., a small concentration of) a hydrophilic surface treatment, provided that the inclusion of such does not detract from the properties contributed by the hydrophobic nanoparticles.

The nanoparticles are typically surface modified prior to mixing the nanoparticles with the particles. The amount of surface modifier is dependent upon several factors such as nanoparticle size, nanoparticle type, molecular weight of the surface modifier, and modifier type. In general, it is preferred that approximately a monolayer of modifier is attached to the surface of the nanoparticle. The attachment procedure or reaction conditions also depend on the surface modifier used. For silanes it is preferred to surface treat at elevated temperatures under acidic or basic conditions for about 1-24 hour. Surface treatment agents such as carboxylic acids do not require elevated temperatures or extended time.

The surface modification of the nanoparticles in the colloidal dispersion can be accomplished in a variety of ways. The process involves the mixture of an inorganic dispersion with surface-modifying agents. Optionally, a co-solvent can be added at this point, such as for example, 1-methoxy-2-propanol, methanol, ethanol, isopropanol, ethylene glycol, N,N-dimethylacetamide, 1-methyl-2-pyrrolidinone, and mixtures thereof. The co-solvent can enhance the solubility of the surface modifying agents as well as the dispersibility of the surface-modified nanoparticles. The mixture of the inorganic dispersion with surface-modifying agents is subsequently reacted at room or an elevated temperature, with or without mixing.

When physically adsorbed on solid surfaces at a polar solid-polar liquid interface, surfactant molecules form micelle-like bilayered surfactant aggregates, called admicelles. In the first surfactant layer of an admicelle, polar portions of the surfactant molecules are adsorbed onto the polar solid surface while the nonpolar portions are oriented away from the solid surface. In the second surfactant layer of the admicelle, nonpolar portions of the surfactant molecules are oriented toward the nonpolar portions of the surfactant molecules of the first layer and the polar portions are oriented toward the polar liquid phase. Just as micelles can incorporate other molecules into their structure in the phenomenon termed solubilization, so admicelles exhibit an analogous behavior which is referred to as adsolubilization. If the surfactant is amphipathic, that is, the surfactant molecule has both a polar end and a nonpolar end and is big enough for each end to display its own solubility behavior, the surfactant may be regarded as having a polar head and a nonpolar tail. An admicelle of such surfactant may be considered as composed of two layers of the surfactant molecules where the tails of one layer are oriented tail-to-tail with the tails of the other layer and where the heads of one layer are adsorbed onto the solid polar surface. The heads of the other layer are oriented toward the polar liquid phase.

The surfactants which can be used to form admicelles are numerous and widely varied and include anionic surfactants, cationic surfactants, nonionic surfactants, and zwitterionic surfactants. Lists of exemplary surfactants can be found in, for example, Kirk-Othmer, *Encyclopedia of Chemical Technology*, Third Edition, Volume 22, John Wiley & Sons, New York (1983), pages 347-386. Examples of cationic surfactants that can be used include N-cocotrimethylenediamine, N-tallowtrimethylene-diamine, cetyldimethylamine oxide, cocodimethylamine oxide, laurylbis(2-hydroxyethyl)amine oxide, cocobis[(polyethoxy)ethanol], stearylbis[(polyethoxy)ethanol], and especially quaternary ammonium salts such as cetyltrimethylammonium bromide, cetyltrimethylammonium chloride, tallowtrimethylammonium chloride, myristyltrimethylammonium bromide, N-laurylpyridinium chloride, dicocodimethylammonium chloride, distearyldimethylammonium chloride, di(hydrogenated tallow)dimethylammonium chloride, and stearylbenzyldimethylammonium chloride. Examples of nonionic surfactants include alcohol ethoxylates such as laurylethoxylate (3 EO), laurylethoxylate (7 EO), laurylethoxylate (23 EO), cetylethoxylate (10 EO), cetylethoxylate (20 EO), stearylethoxylate (10 EO), stearylethoxylate (20 EO), oleylethoxylate (20 EO), and tallowethoxylate (30 EO); alkylphenol ethoxylates such as octylphenylethoxylate (5 EO), octylphenylethoxylate (10 EO), octylphenylethoxylate (30 EO), nonylphenylethoxylate (8 EO), nonylphenylethoxylate (10 EO), nonylphenylethoxylate (15 EO), nonylphenylethoxylate (20 EO), nonylphenylethoxylate (30 EO), and dodecylphenylethoxylate (10 EO); poly(oxyethylene-co-oxypropylene)s such as those in which poly(propylene oxide) is ethoxylated and those in which poly(ethylene oxide) is propoxylated; poly(ethylene glycol) esters of fatty acids; poly(oxyethylene) esters of rosin, tall oil, or fatty acid; and sorbitan esters of tall oil or fatty acid.

Useful anionic surfactants may include, for example, alkylcarboxylates, sulfonates (e.g., petroleum sulfonates, alkylbenzenesulfonates, naphthalenesulfonates, olefin sulfonates), sulfates (e.g., alkyl sulfates, alkarylsulfates, sulfated natural oils & fats, sulfated esters, sulfated alkanolamides, and alkylphenols (ethoxylated & sulfated)).

Useful sulfonate anionic surfactants include alkylsulfonates and alkyl aryl (i.e., alkaryl)sulfonates such as, for example, water-soluble salts or acids of the formula $R^1SO_3M$ wherein M is as defined hereinabove and $R^1$ is a linear or branched alkyl or alkenyl group having from 8 to 30 carbon atoms (e.g., an alkyl or alkenyl group having from 12 to 18 carbon atoms), an alkyl or dialkyl-substituted aryl group having at least 8 carbon atoms in one alkyl moiety and at least 6 carbon atoms in the aryl moiety. Useful sulfonate anionic surfactants also include, for example, mono- and di-alkyl sulfosuccinates having alkyl groups with from at least 8 carbon atoms up to 30 carbon atoms (e.g., 1,4-bis (2-ethylhexyl)sulfo-succinate), glycerol ether sulfonates, α-methyl ester sulfonates, sulfo fatty acids, fatty alcohol ether sulfates, glycerol ether sulfates, hydroxy-mixed ether sulfates, monoglyceride(ether)sulfates, fatty acid amide (ether)sulfates, mono- and dialkyl sulfosuccinates, mono- and dialkyl sulfosuccinamates, sulfotriglycerides, alkyl oligoglucoside sulfates, and combinations of any of the foregoing.

Exemplary fluorinated surfactants include perfluoropolyether surfactants such as, for example, $CF_3OCF_2CF_2CF_2OCHFCF_2COO^-NH_4^+$ from 3M/Dyneon or $CF_3CF_2CF_2OCF(CF_3)COO^-NH_4^+$ from E. I. du Pont de Nemours and Co. (DuPont), Wilmington, Del. Surfactants based on perfluorobutanesulfonic acid are also suitable, such as FC-4430, FC-4432, and FC-4434 available from 3M Company. Additional examples of fluorinated surfactants include $F(CF_2CF_2)_{1-9}CH_2CH_2SO_3Y$ where Y is a mixture of $H^+$ and ammonium. These are known as Zonyl surfactants, and are available from DuPont. Anionic, cationic, amphoteric, and nonionic fluorinated surfactants are available from AGC Seimi Chemical Co., Ltd. as SURFLON S-211, SURFLON S-221, SURFLON S-241, and SURFLON S-241, respectively.

Exemplary preferred anionic surfactants include sodium dodecylbenzenesulfonate, sodium lauryl sulfate, ammonium lauryl sulfate, dioctyl sodium sulfosuccinate, sodium lauryl sulfate, ammonium lauryl sulfate, sodium laurylbenzenesulfonate, sodium lauryl ether sulfate (SLES), sodium laureth sulfate, sodium lauryl ether sulfate (SLES), sodium myreth sulfate, and sodium stearate.

In some preferred embodiments, the surfactant comprises at least one of anionic or nonionic surfactant.

The amount of surfactant in the solution can be widely varied. In most cases, the surfactant constitutes from 0.01 to 10 weight percent of the liquid phase of the composition in which admicellar polymerization is to be carried out. Often the surfactant constitutes from 0.05 to 2 weight percent of the solution, and in many cases, 0.1 to 1 weight percent of surfactant is preferred.

One or more free-radical initiators (e.g., thermal initiators, photoinitiators, and/or redox initiators) are used to polymerize the free-radically polymerizable monomers once in the admicelle. Exemplary free-radical initiators include, for example, azo, peroxide, persulfate, and redox initiators. Suitable azo initiators include, for example, 2,2'-azobis(4-methoxy-2,4-dimethylvaleronitrile); 2,2'-azobis(2-amidinopropane) dihydrochloride; 2,2'-azobis(2,4-dimethylvaleronitrile); 2,2'-azobis(isobutyronitrile) (AIBN); 2,2'-azobis (2-methylbutyronitrile); and 1,1'-azobis(1-cyclohexanecarbonitrile); and 2,2'-azobis(methyl isobutyrate). Suitable peroxide initiators include, for example, benzoyl peroxide, acetyl peroxide, lauroyl peroxide, decanoyl peroxide, dicetyl peroxydicarbonate, di(4-t-butylcyclohexyl)-peroxydicarbonate; di(2-ethylhexyl)peroxydicarbonate; t-butylperoxypivalate; t-butylperoxy-2-ethylhexanoate; and dicurnyl peroxide. Suitable persulfate initiators include, for example, potassium persulfate, sodium persulfate, and ammonium persulfate. Suitable redox (oxidation-reduction) initiators include, for example, combinations of the above persulfate initiators with reducing agents such as sodium metabisulfite and sodium bisulfate; systems based upon organic peroxides and tertiary amines, such as benzoyl peroxide plus dimethylaniline; and systems based on organic hydroperoxides and transition metals, such as cumene hydroperoxide plus cobalt naphthenate. Other free-radical initiators include, for example, pinacols, such as tetraphenyl-1,1,2,2-ethanediol. Preferred free-radical initiators include 2,2'-azobis(2-methylpropionamidine) dihydrochloride, potassium persulfate, sodium persulfate, and AIBN.

The free-radical initiator is present in an amount effective to polymerize the free-radically polymerizable monomers. Typical amounts are in the range of from about 0.01 parts to 10 parts, and more preferably in the range of from about 0.025 parts to about 2 parts by weight, based upon 100 total parts by weight of the total polymerizable composition. If a mixture of free-radical initiators is used, the total amount of the mixture of initiators would be as if a single free-radical initiator was used.

To protect against water reaching the aluminum nitride core, the crosslinked organic polymer preferably includes, more preferably consists at least essentially of, hydrophobic monomeric units, although this is not a requirement. Preferably, the crosslinked organic polymer is at least essentially free (including free of) ionic and/or ionizable groups (e.g., quaternary ammonium ions, acid salts, and acid groups). In some preferred embodiments, the crosslinked organic polymer is acrylic (i.e., contains at least one (meth)acrylic monomer unit).

The crosslinked organic polymer may comprise monomeric units derived from free-radically polymerized monomers. Exemplary suitable free-radically polymerizable monomers may include those having one free-radically polymerizable group, those having at least two free-radically polymerizable groups, and combinations thereof. In some preferred embodiments, the crosslinked organic polymer comprises an acrylic polymer.

Exemplary monomers having one free-radically polymerizable group include (meth)acrylamide, (meth)acrylic acid, (meth)acrylonitrile, 2-(2-ethoxyethoxy)ethyl (meth)acrylate, 2-ethylhexyl (meth)acrylate, 2-hydroxyethyl (meth)acrylate, tetrahydrofurfuryl (meth)acrylate, N,N-dimethylaminoethyl (meth)acrylate, 2-phenoxyethyl (meth)acrylate, 2-phenylethyl (meth)acrylate, caprolactone acrylate, cyclohexyl (meth)acrylate, dodecyl (meth)acrylate, ethoxylated phenoxyethyl (meth)acrylate, ethoxylated tetrahydrofurfuryl (meth)acrylate, hexyl (meth)acrylate, hydroxybutyl (meth)acrylate, hydroxyethyl (meth)acrylate, hydroxyisobutyl (meth)acrylate, hydroxyisopropyl (meth)acrylate, hydroxymethyl (meth)acrylate, hydroxypropyl (meth)acrylate, isobornyl (meth)acrylate, isobutyl (meth)acrylate, isodecyl (meth)acrylate, isononyl (meth)acrylate, isooctyl (meth)acrylate, lauryl (meth)acrylate, methyl (meth)acrylate, N-(n-dodecyl) (meth)acrylamide, N-(n-octadecyl) (meth)acrylamide, N-(tert-octyl) (meth)acrylamide, n-butyl (meth)acrylate, n-decyl (meth)acrylate, n-dodecyl (meth)acrylate, n-hexyl (meth)acrylate, n-octyl (meth)acrylate, nonylphenol ethoxylate (meth)acrylate, N-substituted (meth)acrylamide, N-vinyl-2-pyrrolidone, N-vinylcaprolactam, 2-vinylpyridine, 4-vinylpyridine, octyl (meth)acrylate, phenyl (meth)acrylate, stearyl (meth)acrylate, styrene and substituted styrenes, α-olefins (e.g., ethylene, propylene, butene, 1-hexene, and 1-octene), t-amyl (meth)acrylate, t-butyl (meth)acrylate, tetrahydrofurfuryl (meth)acrylate, tridecyl (meth)acrylate, undecyl (meth)acrylate, benzyl (meth)acrylate, vinyl esters (e.g., vinyl acetate and butyl acetate), vinyl ethers (e.g., ethyl vinyl ether, propyl vinyl ether, butyl vinyl ether), vinyl chloride, vinylidene dichloride, vinyltoluene, β-carboxyethyl (meth)acrylate, and combinations thereof.

Exemplary hydrophobic monomers having one free-radically polymerizable group include 2-ethylhexyl (meth)acrylate, 2-phenoxyethyl (meth)acrylate, benzyl (meth)acrylate, 2-phenylethyl (meth)acrylate, $C_2$-$C_{18}$ alkyl vinyl ethers, cyclohexyl (meth)acrylate, dodecyl (meth)acrylate, eicosyl (meth)acrylate, ethyl (meth)acrylate, heneicosyl (meth)acrylate, heptadecyl (meth)acrylate, hexadecyl (meth)acrylate, hexyl (meth)acrylate, isobornyl (meth)acrylate, isobutyl (meth)acrylate, isodecyl (meth)acrylate, isononyl (meth)acrylate, isooctyl (meth)acrylate, lauryl (meth)acrylate, methyl (meth)acrylate, N-(n-dodecyl) (meth)acrylamide, N-(tert-octyl) (meth)acrylamide, n-butyl (meth)acrylate, n-decyl (meth)acrylate, n-decyl (meth)acrylate, n-dodecyl (meth)acrylate, n-hexyl (meth)acrylate, n-octyl (meth)acrylate, nonadecyl (meth)acrylate, nonylphenol ethoxylate (meth)acrylate, octyl (meth)acrylate, pentadecyl (meth)acrylate, phenyl (meth)acrylate, stearyl (meth)acrylate, dimethylaminoethyl methacrylate, styrene and substituted styrenes (e.g., styrene, α-methylstyrene, 4-t-butylstyrene, and 4-chloromethylstyrene), t-amyl (meth)acrylate, t-butyl (meth)acrylate, tetradecyl (meth)acrylate, tetrahydrofurfuryl (meth)acrylate, tridecyl (meth)(meth)acrylate), and undecyl (meth)acrylate.

Related hydrophobic monomers having one free-radically polymerizable group also include dimethyl maleate, dimethyl itaconate and dimethyl fumarate, and hydrophobic free-radically polymerizable (meth)acrylamides include N-(n-octadecyl) (meth)acrylamide, N-(tert-octyl)(meth) acryl-amide, and N-(n-dodecyl)(meth)acrylamide).

Exemplary hydrophobic monomers having one free-radically polymerizable group also include α-olefins (e.g., 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-diemthyl-1-hexene, 1-nonene, 3,5,5-trimethyl-1-hexene, 1-decene, 1-undecene, 1-dodecene, 1-tridecene, 1-tetracene, 1-pentadecene, 1-hexadecene, 1-heptadecene, 1-octadecene, 1-nonadecene, 1-eicocene, and 1-dococene).

Exemplary monomers having at least two free-radically polymerizable groups include 1,1,1-trimethylolpropane tri (meth)acrylate, 1,4-butanediol di(meth)acrylate, 1,6-hexanediol di(meth)acrylate, 2,4-diethyl-1,5-pentanediol di(meth)acrylate, 2,4-diisopropyl-1,5-pentanediol di(meth) acrylate, 2,4-dimethyl-1,5-pentanediol di(meth)acrylate, 2,4-dipropyl-1,5-pentanediol di(meth)acrylate, 2-ethyl-4-isopropyl-1,5-pentanediol di(meth)acrylate, 2-ethyl-4-methyl-1,5-pentanediol di(meth)acrylate, 2-ethyl-4-propyl-1,5-pentanediol di(meth)acrylate, 2-isopropyl-4-methyl-1,5-pentanediol di(meth)acrylate, 2-isopropyl-4-propyl-1,5-pentanediol di(meth)acrylate, dipentaerythritol penta(meth)acrylate, divinylbenzene, ethoxylated trimethylolpropane tri (meth)acrylate, ethylene glycol di(meth)acrylate, glycerol tri(meth)acrylate, neopentyl glycol di(meth)acrylate, pentaerythritol tetra(meth)acrylate, pentaerythritol tri(meth) acrylate, tetraethylene glycol di(meth)acrylate, triethylene glycol di(meth)acrylate, trimethylolpropane tri(meth)acrylate, bis[2-(methacryloyloxy)ethyl] phosphate, and combinations thereof.

Preferred hydrophobic monomers having at least two free-radically polymerizable groups include divinylbenzene, 1,4-butanediol di(meth)acrylate, neopentyl glycol di(meth) acrylate, 1,6-hexanediol di(meth)acrylate, 2,4-dimethyl-1,5-pentanediol di(meth)acrylate, 2-ethyl-4-methyl-1,5-pentanediol di(meth)acrylate, 2,4-diethyl-1,5-pentanediol di(meth)acrylate, 2-ethyl-4-propyl-1,5-pentanediol di(meth) acrylate, 2,4-dipropyl-1,5-pentanedioldi(meth)acrylate, 2-isopropyl-4-methyl-1,5-pentanediol di(meth)acrylate, 2-ethyl-4-isopropyl-1,5-pentanediol di(meth)acrylate, 2,4-diisopropyl-1,5-pentanediol di(meth)acrylate, 2-isopropyl-4-propyl-1,5-pentanediol di(meth)acrylate, 1,1,1-trimethylolpropane tri(meth)acrylate, pentaerythritol tetra(meth)

acrylate, dipentaerythritol penta(meth)acrylate, bis[2-(methacryloyloxy)ethyl] phosphate, and combinations thereof.

Monomers having at least one free-radically polymerizable group may be used alone or in combination of two or more thereof, for example.

Non-ionic at least partially fluorinated free-radically polymerizable monomers may also be used, although they may require fluorinated surfactant to be admicellar polymerizable. If used, they may be useful for providing hydrophobic properties. Exemplary non-ionic fluorinated monomers include 2-propenoic acid, 2-[methyl[(nonafluorobutyl)sulfonyl]amino]ethyl ester; 2-propenoic acid, 2-methyl-, 2-[methyl[(nonafluorobutyl)sulfonyl]amino]ethyl ester; 1H,1H-heptafluoro-n-butyl (meth)acrylate; 1H,1H-pentafluoropropyl (meth)acrylate; 1,1,3-trihydroperfluorobutyl (meth)acrylate; 4,4'-(hexafluoroisopropylidene)diphenyl di(meth)acrylate; 3-(trifluoromethyl)benzyl (meth)acrylate; 1H,1H,2H,2H-nonafluorohexyl (meth)acrylate; 2,3,4,5,6-pentafluorostyrene; 3,4,5,6-tetraafluorostyrene; 2,4,5,6-tetraafluorostyrene; 2,3,5,6-tetraafluorostyrene; 3,4,5-trifluorostyrene; 2,3,4-trifluorostyrene; 2,4,5-trifluorostyrene; 2,4,6-trifluorostyrene; 2,3,5-trifluorostyrene; 2,3,6-trifluorostyrene; 2,3-difluorostyrene; 2,4-difluorostyrene; 2,6-difluorostyrene; 2,5-difluorostyrene; 3,4-difluorostyrene; 4-(trifluoromethyl)styrene; 3-(trifluoromethyl)styrene; 2-(trifluoromethyl)styrene; (4-trifluoromethyl)-2-fluorostyrene; 2,3-difluoro-4-(trifluoromethyl)styrene; 3,5-bis(trifluoromethyl)styrene; 2-fluoro-5-(trifluoromethyl)styrene; 2-fluoro-3-(trifluoromethyl)styrene; 2,4-difluoro-3-(trifluoromethyl)styrene; 4-hydroxy-2,3,5,6-tetrafluorostyrene; (4-trifluoromethyl)-2-fluorostyrene; 4-fluorostyrene; and 3-fluorostyrene.

Modified aluminum nitride particles are suitable for incorporating into an organic binder material to form various compositions comprising a plurality of modified aluminum nitride particles according to the present disclosure retained in an organic binder material.

Suitable organic binder materials may include thermoplastic and/or thermosetting materials.

Suitable thermoplastic materials may include polyurethanes, polyamides, polyolefins (for example, polyethylene, polypropylene and compounded blends thereof which may include thermoplastic elastomeric materials such as ethylene-propylene elastomer), polyesters, and combinations thereof. These materials may also comprise one or more additives, including but not limited to fillers, fibers, antistatic agents, lubricants, wetting agents, pigments, dyes, coupling agents, plasticizers, and suspending agents.

Suitable thermosetting materials may include, for example, cyanate resins, phenolic resins, urea-formaldehyde resins, melamine-formaldehyde resins, benzoxazines, oxetanes, polyimides, silicone resins, urethane resins, (meth)acrylates, polyester resins, aminoplast resins having pendant alpha, beta-unsaturated carbonyl groups, epoxy resins, acrylated urethane, acrylated epoxies, combinations of the foregoing, and polymerized reaction products of the foregoing. For thermosettable materials that require a curative (e.g., catalyst, initiator, and/or hardener), one is typically included in the composition before curing; generally, in an effective amount to cause thermosetting. The choice of curative and amount will be readily ascertainable by those of ordinary skill in the art.

The amount of modified aluminum nitride particles is preferably from 10 to 2000 parts by weight, preferably 20 to 200 parts by weight, relative to 100 parts by weight of the weight of the organic binder material. If the amount of modified aluminum nitride particles is less than 10 parts by weight (absent any other added thermally-conductive filler particles), it may be difficult to obtain adequate thermal conductivity, while conversely if the amount exceeds 2000 parts by weight, it is difficult to uniformly disperse the aluminum nitride particles in the organic binder material.

Compositions according to the present disclosure may further contain secondary thermally-conductive filler particles, if desired. Useful thermally-conductive fillers may include ceramics, metal oxides, metals, and metal hydrates.

If secondary thermally-conductive filler particles are also present, it is preferred that they have an average particle diameter of below 10 microns so as to increase the amount of the second thermally conductive filler that can be added to the organic binder material. Secondary thermally-conductive filler particles may be subjected to a surface treatment such as, for example, an organosilane, titanate, or fatty acid.

Various kinds of additives may be added to compositions according to the present disclosure. Examples of additives include crosslinking agents, tackifiers, antioxidants, chain-transfer agents, plasticizers, flame retardants, flame retarding synergists, precipitation inhibitors, thickeners, thixotropic agents such as ultra-fine silica powder, colorants, electrically conductive particles, antistatic agents, and surface-treating agents, and combinations of the foregoing.

Modified aluminum nitride particle according to the present disclosure can be made, for example, by a process known in the art as admicellar polymerization.

Admicellar polymerization involves the following steps.

The first step involves formation of admicelles on a substrate in the presence of a (typically) aqueous liquid containing surfactant. An admicelle, in simple terms, is the formation of bilayer of surfactant molecules on the substrate. Formation of the bilayers may be simultaneous or through a step-by-step process in which a monolayer is formed adjacent to the surface first and then the upper layer gets formed onto it.

The second step involves adsolubilization. The concentration of the surfactant at which micelle-like aggregates start forming at the solid/liquid interface is termed as the critical admicelle concentration (CAC) or critical hemimicelle concentration (CHC). Free-radically polymerizable monomers and optionally free-radical initiator are adsolubilized into the admicelle at this stage.

The third step involves polymerization. Polymerization takes place within the monomers adsolubilized in the admicelle.

An optional, but typical, fourth step includes solvent removal of the outer upper layer of surfactant and traces of unreacted monomer and optionally some of the bottom layer.

Accordingly, the present disclosure provides a method in which aluminum nitride particles are provided as an acidic aqueous dispersion. Preferably the pH is between 6 and 1, more preferably between 5 and 2, and more preferably between 4 and 2, wherein all of the foregoing pH ranges are inclusive of their endpoints. The acidic aqueous dispersion of aluminum nitride particles also includes at least one surfactant; preferably including anionic and/or nonionic surfactant, although other surfactants may also be used.

Next, at least one hydrophobic free-radically polymerizable monomer and a soluble free-radical initiator monomer is added to the aqueous acidic mixture (e.g., with vigorous stirring) to form a free-radically polymerizable mixture, with at least a portion of the at least one hydrophobic free-radically polymerizable monomer is disposed in a surfactant bilayer that is disposed on the aluminum nitride particles.

After this step at least one free-radical initiator is introduced into the free-radically polymerizable mixture thereby polymerizing at least a portion of the hydrophobic free-radically polymerizable monomer to form the modified aluminum nitride particles, each comprising an aluminum nitride core and a shell surrounding the aluminum nitride core, wherein the shell comprises a crosslinked organic polymer.

Afterward, the modified aluminum nitride particles may be isolated, and optionally at least the outer layer and some of the inner layer of surfactant removed from them by washing with a suitable solvent (e.g., water/ethanol).

Admicelles may be induced to form above, at, or below the critical micelle concentration (CMC) of the surfactant, which is typically dependent on factors such as, for example, pH, temperature, and ionic strength of the aqueous acidic mixture. Selection of appropriate parameters will be apparent to those of skill in the art. Additional guidance concerning admicellar polymerization can be found in U.S. Pat. Nos. 5,106,691 and 5,426,136 (both to Harwell et al.). Irrespective of the surfactant concentration relative to the CMC when they are formed, it is preferred that at equilibrium the surfactant concentration be below the CMC. There are two main advantages for this, both based upon the lack of micelles in the liquid. First, the substantial absence of micelles in the liquid tends to concentrate monomer in the admicelles. Second, the substantial absence of micelles in the liquid encourages a low concentration of monomer in the liquid and hence discourages monomer polymerization in the liquid. Again, although it is not desired to be bound by any theory, it is believed that admicelles can exist and be formed below the CMC because the solid surface provides an environment more favorable to admicelle formation than the liquid provides for micelle formation.

Admicelle formation on polar solid surfaces may be induced at surfactant concentrations below the CMC by manipulation of the identity of the surfactant, solution pH, and counterion concentration. To obtain admicelle formation, the most critical parameters to be manipulated are the solution pH and the identity and type of surfactant employed. As the pH of the surfactant solution is progressively lowered below the point of zero charge (PZC), the polar solid surface becomes progressively more protonated and more positively charged. Conversely, as the pH of the surfactant solution is progressively increased above the PZC, the solid surface becomes progressively more negatively charged. Anionic surfactants are therefore more readily adsorbed by polar solid surfaces to form admicelles at values of surfactant solution pH below the PZC while cationic surfactants are more readily adsorbed to form admicelles at values of surfactant solution pH above the PZC. The PZC does not represent a sharp discontinuity, however, for admicelles of anionic surfactants can be formed at and somewhat above the PZC and admicelles of cationic surfactants can be formed at and somewhat below the PZC. Nonionic surfactants are adsorbed by polar solid surfaces to form admicelles at, above, and below the PZC.

The solvent of the surfactant solution is generally aqueous. Water may be used alone but in many instances a mixture of water and at least one organic polar cosolvent is used. Examples of polar compounds that can be used as cosolvents include methanol, ethanol, n-propanol, isopropanol, n-butanol, isobutanol, sec-butanol, tert-butanol, n-pentanol, ethylene glycol, 2-methoxyethanol, 2-ethoxyethanol, acetone, methyl ethyl ketone, methyl acetate, ethyl acetate, and acetonitrile. A single organic polar cosolvent or a mixture of organic polar cosolvents may be used. One preferred solvent of the surfactant solution is a mixture of water and ethanol.

The temperature during admicelle formation may be any temperature where a liquid solution can be maintained. In most instances the temperature is in the range of from −10° C. to +90° C. Preferably the temperature is in the range of from 0° C. to 40° C. The pressure during admicelle formation may be subatmospheric, ambient atmospheric, or superatmospheric, as desired.

As will be more fully developed below, the process for forming admicelles is conducted such that as equilibrium is approached, the concentration of the surfactant in the liquid phase is preferably below the critical micelle concentration. At such concentrations the admicelle formation over the modified aluminum nitride particle surface will be patchwise. Admicelle formation which substantially completely covers and is substantially coextensive with the modified aluminum nitride particles can be accomplished. In order to achieve this, however, the concentration of the surfactant in the surfactant solution must ordinarily be above or at the CMC or, if below the CMC, very near to it.

Free-radically polymerizable monomers may be introduced to the system after formation of the admicelles or it may be present during their formation. The admicelles may be viewed as a two-dimensional solvent in which monomer can be adsolubilized.

The amount of free-radically polymerizable monomer in the liquid phase can be widely varied. In most cases the monomer constitutes from 0.01 to 10 weight percent of the liquid phase. Often the monomer constitutes from 0.05 to 5 weight percent of the solution. From 0.1 to 1 weight percent is preferred.

The surfactant, monomer, and free-radical initiator can be introduced to the solution simultaneously or sequentially and in any order. In most cases it will be preferred to dissolve and/or disperse the surfactant, monomer, and initiator in the liquid phase.

Although it is preferable for the surfactant concentration in the liquid phase to be below the CMC when the monomer is polymerized, it is also preferable that the surfactant concentration of the solution be above the CMC when the solution is brought into contact with the particulate aluminum nitride. This procedure is especially preferred when nonpolar monomer is also a component of the solution. Once the solution is brought into contact with the particulate aluminum nitride, admicelle formation removes surfactant from the liquid phase so that as equilibrium is approached the concentration of the surfactant in the liquid phase is below the CMC. Adsolubilization of the monomer similarly reduces the monomer concentration in the liquid phase or, if additional monomer is introduced to the system, allows further quantities of monomer to be dissolved.

The temperature during polymerization may be any temperature where the monomer or monomers are customarily polymerized. In most instances the temperature is in the range of from −10° C. to 95° C. Preferably, the temperature is in the range of from 40° C. to 90° C. When the temperature is above ambient temperature, the reaction may be commenced by thermal decomposition of the initiator.

Following polymerization of the monomer, the modified aluminum nitride particles may be separated from the liquid and then dried. Optionally, the modified aluminum nitride particles may be washed with water or other polar solvent prior to final drying. Such washing is beneficial because it removes at least some of the surfactant which would otherwise be present.

SELECT EMBODIMENTS OF THE PRESENT DISCLOSURE

In a first embodiment, the present disclosure provides a modified aluminum nitride particle comprising an aluminum nitride core and a shell surrounding the aluminum nitride core, wherein the shell comprises a crosslinked organic polymer.

In a second embodiment, the present disclosure provides a modified aluminum nitride particle according to the first embodiment, wherein the shell further comprises surfactant.

In a third embodiment, the present disclosure provides a modified aluminum nitride particle according to the first or second embodiment, wherein the crosslinked organic polymer comprises hydrophobic monomeric units.

In a fourth embodiment, the present disclosure provides a modified aluminum nitride particle according to any one of the first to third embodiments, wherein the crosslinked organic polymer comprises an acrylic polymer.

In a fifth embodiment, the present disclosure provides a modified aluminum nitride particle according to any one of the first to third embodiments, wherein the crosslinked organic polymer comprises crosslinked polystyrene or a crosslinked copolymer of styrene and at least one hydrophobic (meth)acrylic monomer.

In a sixth embodiment, the present disclosure provides a modified aluminum nitride particle according to any one of the first to fifth embodiments, wherein the crosslinked organic polymer is at least partially fluorinated.

In a seventh embodiment, the present disclosure provides a plurality of modified aluminum nitride particles according to any one of the first to sixth embodiments.

In an eighth embodiment, the present disclosure provides a plurality of modified aluminum nitride particles according to the seventh embodiment, further comprising a flow additive comprising at least one of fumed or precipitated silica, fumed or precipitated alumina, silica nanoparticles, or alumina nanoparticles.

In a ninth embodiment, the present disclosure provides a composition comprising a plurality of modified aluminum nitride particles according to the seventh or eighth embodiment retained in an organic binder material.

In a tenth embodiment, the present disclosure provides a method of making modified aluminum nitride particles, the method comprising:
  providing an aqueous acidic mixture of aluminum nitride particles and surfactant;
  adding at least one hydrophobic free-radically polymerizable monomer to the aqueous acidic mixture to form a free-radically polymerizable mixture, wherein at least a portion of the at least one hydrophobic free-radically polymerizable monomer is disposed in a surfactant bilayer that is disposed on the aluminum nitride particles, wherein the at least one hydrophobic free-radically polymerizable monomer includes a monomer having at least two free-radically polymerizable groups; and
  adding a free-radical initiator to the free-radically polymerizable mixture thereby polymerizing at least a portion of the hydrophobic free-radically polymerizable monomer to form the modified aluminum nitride particles, each comprising an aluminum nitride core and a shell surrounding the aluminum nitride core, wherein the shell comprises a crosslinked organic polymer.

In an eleventh embodiment, the present disclosure provides a method of making modified aluminum nitride particles according to the tenth embodiment, further comprising isolating the modified aluminum nitride particles.

In a twelfth embodiment, the present disclosure provides a method of making modified aluminum nitride particles according to the tenth or eleventh embodiment, wherein the shell further comprises the surfactant.

In a thirteenth embodiment, the present disclosure provides a method of making modified aluminum nitride particles according to any one of the tenth to twelfth embodiments, wherein the surfactant is at least partially fluorinated.

In a fourteenth embodiment, the present disclosure provides a method of making modified aluminum nitride particles according to any one of the tenth to thirteenth embodiments, wherein the crosslinked organic polymer comprises hydrophobic monomeric units.

In a fifteenth embodiment, the present disclosure provides a method of making modified aluminum nitride particles according to any one of the tenth to fourteenth embodiments, wherein the crosslinked organic polymer comprises an acrylic polymer.

In a sixteenth embodiment, the present disclosure provides a method of making modified aluminum nitride particles according to any one of the tenth to fifteenth embodiments, wherein the crosslinked organic polymer comprises crosslinked polystyrene or a crosslinked copolymer of styrene and at least one hydrophobic (meth)acrylic monomer.

In a seventeenth embodiment, the present disclosure provides a method of making modified aluminum nitride particles according to any one of the tenth to sixteenth embodiments, wherein the monomer having at least two free-radically polymerizable groups comprises at least one of divinylbenzene, 1,6-hexanediol di(meth)acrylate, 2,4-dimethyl-1,5-pentanediol di(meth)acrylate, 2-ethyl-4-methyl-1,5-pentanediol di(meth)acrylate, 2,4-diethyl-1,5-pentanediol di(meth)acrylate, 2-ethyl-4-propyl-1,5-pentanediol di(meth)acrylate, 2,4-dipropyl-1,5-pentanedioldi(meth)acrylate, 2-isopropyl-4-methyl-1,5-pentanediol di(meth)acrylate, 2-ethyl-4-isopropyl-1,5-pentanediol di(meth)acrylate, 2,4-diisopropyl-1,5-pentanediol di(meth)acrylate, 2-isopropyl-4-propyl-1,5-pentanediol di(meth)acrylate, 1,1,1-trimethylolpropane tri(meth)acrylate, pentaerythritol tetra (meth)acrylate, bis[2-(methacryloyloxy)-ethyl] phosphate, or dipentaerythritol penta(meth)acrylate.

In an eighteenth embodiment, the present disclosure provides a method of making modified aluminum nitride particles according to any one of the tenth to seventeenth embodiments, wherein the at least one hydrophobic free-radically polymerizable monomer comprises at least one of styrene, N-(n-octadecyl) (meth)acrylamide, t-amyl (meth)acrylate, t-butyl (meth)acrylate, cyclohexyl (meth)acrylate, isodecyl (meth)acrylate, n-decyl (meth)acrylate, n-dodecyl (meth)acrylate, N-(n-dodecyl)(meth)acrylamide, n-hexyl (meth)acrylate, n-octyl (meth)acrylate, N-(tert-octyl)(meth)acrylamide, 2-phenoxyethyl (meth)acrylate, phenyl (meth)acrylate, 2-phenylethyl (meth)acrylate, stearyl (meth)acrylate, undecyl (meth)acrylate, isobornyl (meth)acrylate, tridecyl (meth)(meth)acrylate, 1,4-butanediol di(meth)acrylate, 2-ethylhexyl methacrylate, methyl methacrylate, tetrahydrofurfuryl methacrylate, benzyl methacrylate, dimethylaminoethyl methacrylate or neopentyl glycol di(meth)acrylate.

In a nineteenth embodiment, the present disclosure provides a method of making modified aluminum nitride particles according to any one of the tenth to eighteenth embodiments, further comprising adding flow additive to the aluminum nitride particles before adding the at least one hydrophobic free-radically polymerizable monomer to the aqueous acidic mixture, wherein the flow additive comprises at least one of fumed or precipitated silica, fumed or precipitated alumina, silica nanoparticles, or alumina nanoparticles.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Materials

Unless stated otherwise, all other reagents were obtained, or are available from fine chemical vendors such as Sigma-Aldrich Company, St. Louis, Mo., or may be synthesized by known methods. Table 1, below, reports abbreviations and sources of materials used in the Examples.

ited on the particles during the polymerization. Weight loss results are reported in Table 2B.

Soxhlet Extraction

Soxhlet extraction was used to study the solvent resistance of the coatings. A small sample of the dried particles were placed in a Soxhlet thimble and loaded into the main chamber of a Soxhlet extractor. The solvent in the solvent flask was then heated to reflux and warm solvent filled the Soxhlet chamber housing the thimble of solid. The Soxhlet chamber was emptied periodically by siphon to keep the chamber from becoming too full of solvent. The siphoned solvent was returned to the solvent flask where it was reheated and refluxed through the Soxhlet extractor again. This process was repeated for the duration of the extraction period. In all instances, the extractions were run for a minimum of 8 hours to a maximum of 24 hours.

The Soxhlet extraction procedure was performed twice, on two different samples using two different solvents. The solvents used were tetrahydrofuran (THF) and methanol (MeOH). The particles after extraction were dried in a vacuum oven and evaluated by TGA. Any change in weight loss between the Soxhlet-extracted and pre-Soxhlet sample was attributed to having a coating not well anchored to the particle surface.

TABLE 1

| DESIGNATION | MATERIAL | SOURCE |
|---|---|---|
| SDS | sodium dodecyl sulfate, 99% | Alfa Aesar, Haverhill, Massachusetts |
| FC-4430 | FLUOROSURFACTANT FC-4430, nonionic fluorochemical | 3M Company, Maplewood, Minnesota |
| 2-EHMA | 2-ethylhexyl methacrylate | TCI America, Portland, Oregon (>99%) |
| MMA | methyl methacrylate | Alfa Aesar, Haverhill, Massachusetts (99%) |
| Styrene | styrene | Sigma-Aldrich |
| P-Xlink | bis[2-(methacryloyloxy)ethyl] phosphate | Sigma-Aldrich |
| EGDMA | ethylene glycol dimethacrylate, 99% | Alfa Aesar |
| THFMA | tetrahydrofurfuryl methacrylate, 99% | Alfa Aesar |
| BMA | benzyl methacrylate | Alfa Aesar |
| DMAEMA | dimethylaminoethyl methacrylate | Alfa Aesar |
| FA | $H_2C=C(H)-C(O)-O-CH_2-C(CH_3)(CH_2)-N-S(O)_2-CF_2CF_2CF_2CF_3$ | Prepared generally as described in U.S. Pat. No. 6,664,354 B2 (Savu et al.) in Example 2 |
| AlN | aluminum nitride, 10μ, 98% | Sigma-Aldrich |
| KPS | potassium persulfate, ACS grade | Amresco, Solon, Ohio |
| $H_3PO_4$ | phosphoric acid (85% in water) | Sigma-Aldrich |

Test Methods

Thermal Gravimetric Analysis (TGA)

The sample was heated to 100-120° C. and held for 20 minutes at that temperature under nitrogen gas to remove absorbed water and residual solvents. The sample was then cooled to 40° C. and subsequently heated to 550° C. at a rate of 10° C./minute under nitrogen gas. The weight loss was recorded at 500° C. Weight loss occurring below 500° C. was interpreted as the gravimetric amount of polymer depospH Monitoring The particles, after having been cleaned with MeOH or THF in the Soxhlet extractor, were added to DI water at 2% w/v. The vial was then sealed and heated to 80° C. in an oven for 1 week. The pH of the solution was monitored with pH paper on periodic basis for up to a week. The results are reported in Table 3.

Hydrophobicity Test

The particles were tested for hydrophobicity by placing a water drop on a spatula tip holding the particles. The particles were considered hydrophobic (Y) if the water beaded up on the particles, if not (N). The results are reported in Table 2B. The test was repeated after washing the particles with THF using the Soxhlet extraction procedure.

General Procedure for Modified AlN Particle Preparation

Aluminum nitride (AlN) particles (10 g) were added to a 4-ounce (oz) (118 mL) glass jar equipped with a magnetic stir bar. The particles were diluted to approximately 20% solids with a water/phosphoric acid solution. The phosphoric acid solution was between 0.2%-0.3% weight/volume (w/v). To this solution, a surfactant was added (according to Table 2A). The solution was stirred for more than 4 hours. Monomer was then added according to Table 2A, where the required monomer was computed on a molar ratio, relative to the surfactant. A typical ratio was 10 or 15 moles of combined monomer and crosslinker to 1 mole of surfactant. The polymerization was initiated by adding potassium persulfate, sealing the jar well with electrical tape, heating to 80° C., and stirring for more than 12 hours. In all instances, the amount of initiator was in a 1:10 molar ratio relative to the combination of monomer and crosslinker.

The particles were isolated by vacuum filtration using a type-E glass frit. The particles were further purified by washing with deionized (DI) water and DI water/methanol (50/50 wt:wt). The total volume of DI water and DI water/methanol used in the washes was greater than 200 mL for each. The particles were then vacuum dried.

Tables 2A and 2B, below, report Formulation and TGA results for Comparative Examples CEX-A and CEX-B, and Examples EX-1 through EX-8.

In the Tables, "mM" means millimolar, "ppm" means parts per million by weight, "NM" means not measured, and "NA" means not applicable.

TABLE 3

| EXAMPLE | pH Stability of MeOH and THF Washed Particles | | | | |
|---|---|---|---|---|---|
| | 1 Day | 3 Days | 5 Days | 6 Days | 8 Days |
| | MeOH Washed | | | | |
| CEX-A | 11 | 11 | 11 | 11 | 11 |
| EX-2 | 7 | 7 | 7 | 7 | 7 |
| EX-3 | 7 | 7 | 7 | 7 | 7 |
| EX-4 | 6.5 | 7 | 7 | 7 | 7 |
| EX-5 | 6.5 | 7 | 7 | 8 | 8 |
| EX-6 | 7 | 7 | 7 | 7 | 7 |
| EX-7 | 6.5 | 7 | 7 | 7 | 7 |
| EX-8 | 11 | 11 | 11 | 11 | 11 |
| | THF Washed | | | | |
| CEX-A | 11 | 11 | 11 | 11 | 11 |
| EX-2 | 7 | 7 | 7 | 8 | 9 |
| EX-3 | 6.5 | 7 | 7 | 7 | 7 |
| EX-4 | 6.5 | 7 | 7 | 7 | 7 |
| EX-5 | 7 | 9 | 9 | 10 | 11 |
| EX-6 | 7 | 7 | 7 | 8 | 8 |
| EX-7 | 7 | 7 | 7 | 7 | 7 |
| EX-8 | 11 | 11 | 11 | 11 | 11 |

All cited references, patents, and patent applications in the above application for letters patent are herein incorporated by reference in their entirety in a consistent manner. In the

TABLE 2A

| | SURFACTANT | | MONOMER | | CROSSLINKER | |
|---|---|---|---|---|---|---|
| EXAMPLE | Species | Concentration | Species | Surfactant/Monomer Ratio | Species | Surfactant/Crosslinker Ratio |
| CEX-A | none | NA | NA | NA | NA | NA |
| CEX-B | SDS | 2 mM | 2-EHMA | 15 | none | |
| EX-1 | SDS | 2 mM | 2-EHMA | 7.5 | EGDMA | 7.5 |
| EX-2 | SDS | 2 mM | 2-EHMA | 7.5 | P-Xlink | 7.5 |
| EX-3 | SDS | 2 mM | MMA | 7.5 | P-Xlink | 7.5 |
| EX-4 | SDS | 2 mM | BMA | 7.5 | P-Xlink | 7.5 |
| EX-5 | SDS | 2 mM | PS | 7.5 | P-Xlink | 7.5 |
| EX-6 | SDS | 2 mM | DMAEMA | 7.5 | P-Xlink | 7.5 |
| EX-7 | SDS | 2 mM | THFMA | 7.5 | P-Xlink | 7.5 |
| EX-8 | FC-4430 | 1150 ppm | FA | 3 (w/w) | P-Xlink | 0.3 (w/w) |

TABLE 2B

| | TGA WEIGHT LOSS, % | | | HYDROPHOBICITY TEST | |
|---|---|---|---|---|---|
| | | After Soxhlet Extraction with | | | After Soxhlet Extraction |
| EXAMPLE | As Prepared | MeOH | THF | As Prepared | with THF |
| CEX-A | 0.4 | NM | NM | N | N |
| CEX-B | 2.2 | NM | 0.6 | Y | very slight |
| EX-1 | 3.6 | NM | 2.9 | Y | Y |
| EX-2 | 2.6 | 2.6 | 2.7 | Y | Y |
| EX-3 | 1.6 | 1.5 | 1.8 | Y | Y |
| EX-4 | 1.9 | 2.1 | 2.0 | Y | slight |
| EX-5 | 1.2 | 1.2 | 1.2 | Y | Y |
| EX-6 | 1.1 | 1.2 | 1.2 | Y | Y |
| EX-7 | 2.0 | 2.0 | 2.1 | Y | Y |
| EX-8 | 0.6 | 0.4 | 0.4 | Y | Y | event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making modified aluminum nitride particles, the method comprising:
providing an aqueous acidic mixture of aluminum nitride particles and surfactant;
adding at least one hydrophobic free-radically polymerizable monomer to the aqueous acidic mixture to form a free-radically polymerizable mixture, wherein at least a portion of the at least one hydrophobic free-radically polymerizable monomer is disposed in a surfactant bilayer that is disposed on the aluminum nitride particles, wherein the at least one hydrophobic free-radically polymerizable monomer includes a monomer having at least two free-radically polymerizable groups; and
adding a free-radical initiator to the free-radically polymerizable mixture thereby polymerizing at least a portion of the hydrophobic free-radically polymerizable monomer to form modified aluminum nitride particles, each comprising an aluminum nitride core and a shell surrounding the aluminum nitride core, wherein the shell comprises a crosslinked organic polymer.

2. The method of claim 1, further comprising isolating the modified aluminum nitride particles.

3. The method of claim 1, wherein the shell further comprises the surfactant.

4. The method of claim 1, wherein the surfactant is at least partially fluorinated.

5. The method of claim 1, wherein the crosslinked organic polymer comprises hydrophobic monomeric units.

6. The method of claim 1, wherein the crosslinked organic polymer comprises an acrylic polymer.

7. The method of claim 1, wherein the crosslinked organic polymer comprises crosslinked polystyrene or a crosslinked copolymer of styrene and at least one hydrophobic (meth) acrylic monomer.

8. The method of claim 1, wherein the monomer having at least two free-radically polymerizable groups comprises at least one of divinylbenzene, 1,6-hexanediol di(meth) acrylate, 2,4-dimethyl-1,5-pentanediol di(meth)acrylate, 2-ethyl-4-methyl-1,5-pentanediol di(meth)acrylate, 2,4-diethyl-1,5-pentanediol di(meth)acrylate, 2-ethyl-4-propyl-1, 5-pentanediol di(meth)acrylate,2,4-dipropyl-1,5-pentanedioldi(meth)acrylate, 2-isopropyl-4-methyl-1,5-pentanediol di(meth)acrylate, 2-ethyl-4-isopropyl-1,5-pentanediol di(meth)acrylate, 2,4-diisopropyl-1,5-pentanediol di(meth)acrylate, 2-isopropyl-4-propyl-1,5-pentanediol di(meth)acrylate, 1,1,1-trimethylolpropane tri (meth)acrylate, pentaerythritol tetra(meth)acrylate, bis[2-(methacryloyloxy)ethyl] phosphate, or dipentaerythritol penta(meth)acrylate.

9. The method of claim 1, wherein the at least one hydrophobic free-radically polymerizable monomer comprises at least one of styrene, N-(n-octadecyl) (meth)acrylamide, t-amyl (meth)acrylate, t-butyl (meth)acrylate, cyclohexyl (meth)acrylate, isodecyl (meth)acrylate, n-decyl (meth)acrylate, n-dodecyl (meth)acrylate, N-(n-dodecyl) (meth)-acrylamide, n-hexyl (meth)acrylate, n-octyl (meth) acrylate, N-(tert-octyl)(meth)acrylamide, 2-phenoxyethyl (meth)acrylate, phenyl (meth)acrylate, 2-phenylethyl (meth) acrylate, stearyl (meth)acrylate, undecyl (meth)acrylate, isobornyl (meth)acrylate, tridecyl (meth)(meth)acrylate, 1,4-butanediol di(meth)acrylate, 2-ethylhexyl methacrylate, methyl methacrylate, tetrahydrofurfuryl methacrylate, benzyl methacrylate, dimethylaminoethyl methacrylate or neopentyl glycol di(meth)acrylate.

10. The method of claims 1, further comprising adding flow additive to the aluminum nitride particles before adding the at least one hydrophobic free-radically polymerizable monomer to the aqueous acidic mixture, wherein the flow additive comprises at least one of fumed or precipitated silica, fumed or precipitated alumina, silica nanoparticles, or alumina nanoparticles.

* * * * *